United States Patent [19]

Hoffman et al.

[11] 4,087,887

[45] May 9, 1978

[54] SHRIMP PROCESSING DEVICE AND METHOD

[76] Inventors: Paul H. Hoffman, 18003 NW. 78 Ave., Hialeah, Fla. 33015; John A. Lessig, 4140 Hardie Ave., Miami, Fla. 33133

[21] Appl. No.: 727,647

[22] Filed: Sep. 29, 1976

[51] Int. Cl.² .................. A22C 25/08; A22C 29/02
[52] U.S. Cl. .......................................... 17/73; 17/61
[58] Field of Search ............... 17/52, 48, 61, 71, 72, 17/73, 57, 58, 59, 16, 18; 198/689

[56] References Cited

U.S. PATENT DOCUMENTS

| | | | |
|---|---|---|---|
| 9,799 | 7/1881 | Tompkins | 17/16 |
| 1,034,525 | 8/1912 | Smith | 17/58 |
| 2,946,085 | 7/1960 | Farchmin | 17/18 |
| 3,040,374 | 6/1962 | Miller | 17/72 |
| 3,159,871 | 12/1964 | Jonsson | 17/48 |
| 3,164,859 | 1/1965 | Ambos et al. | 17/48 |
| 3,238,561 | 3/1966 | Jonsson | 17/48 |
| 3,249,962 | 5/1966 | Rossnan | 17/48 |
| 3,596,310 | 8/1971 | Tolley | 17/71 |
| 3,698,038 | 10/1972 | Jones, Jr. | 17/71 |
| 3,754,301 | 8/1973 | Grimes | 17/58 |
| 3,771,647 | 11/1973 | Cumpston, Jr. | 198/689 |
| 3,787,928 | 1/1974 | Domecki | 17/71 |
| 3,867,740 | 2/1975 | Lapine et al. | 17/72 |
| 3,896,536 | 7/1975 | Keller et al. | 198/689 |
| 3,962,752 | 6/1976 | Cookie et al. | 17/71 |

Primary Examiner—Russell R. Kinsey
Assistant Examiner—Paul J. Hirsch
Attorney, Agent, or Firm—Robert E. Isner

[57] ABSTRACT

Method and apparatus for processing shrimp and like arthropoda, comprising a housing, positively driven transport means disposed within the housing and containing a plurality of peripherally extending needles for engaging and impaling deheaded shrimp in a predetermined attitude to sequentially advance them through a plurality of operating stations in a path, defined at least in part, by a selectively shaped tunnel within said housing. The entry to said tunnel is contoured to properly orient the shrimp and to facilitate its initial positioning and displacement relative to the transport means by pneumatic forces. At the first operating station, the relatively thin abdominal shell or membrane disposed on the ventral side of the first five shell segments is longitudinally severed and the interconnection between the swimmerettes and the shrimp body is disrupted. At a second station, the dependent ends of the front five body shell segments of a positively positioned shrimp are loosened and displaced relative to the contained meat, after which the so loosened shell segments are sequentially removed by pneumatically induced shell displacement in the ventral to dorsal direction to ultimately break the condyle joints. At a subsequent station the dorsal surface of the peeled shrimp meat is longitudinally cut to a predetermined depth to expose the midgut vein for hydraulically assisted pneumatic removal. At a final station the shrimp may be further cut longitudinally along its dorsal side under ventral side applied pressure to provide a "butterfly" type configuration.

32 Claims, 19 Drawing Figures

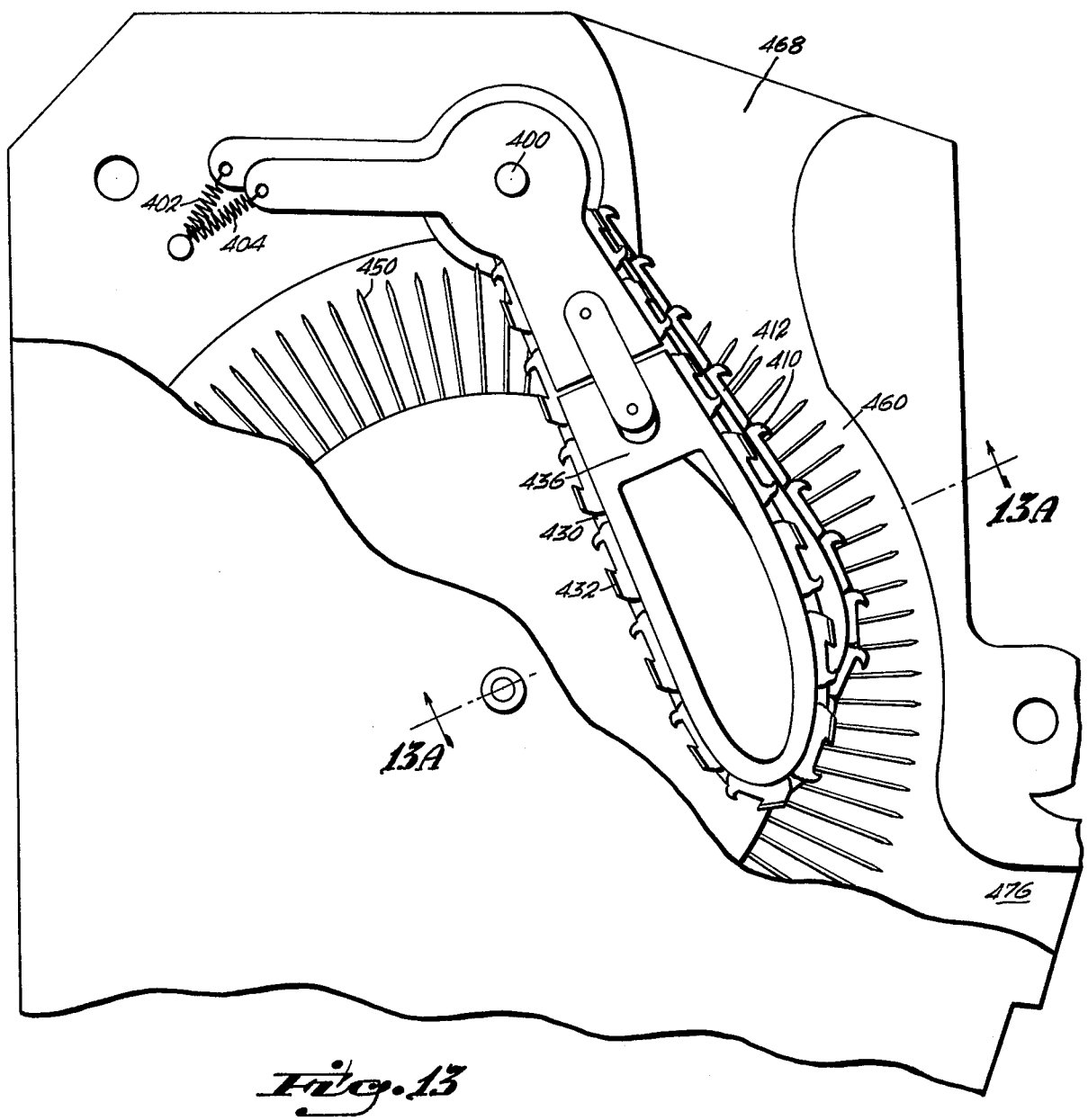
Fig. 13
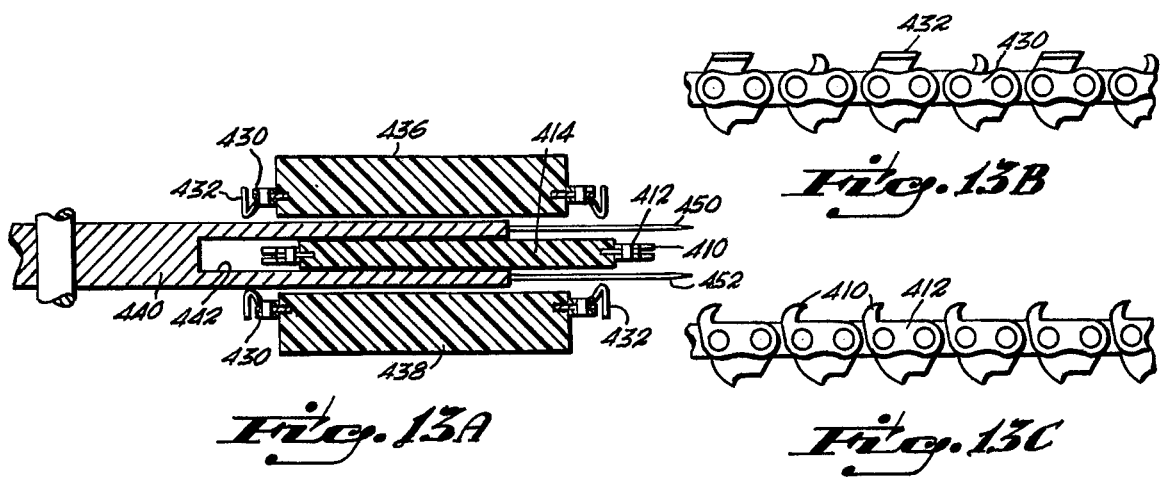
Fig. 13A
Fig. 13B
Fig. 13C

SHRIMP PROCESSING DEVICE AND METHOD

This invention relates to an improved method and apparatus for processing deheaded shrimp and like arthropoda to produce a "fantail" product.

STATE OF THE PRIOR ART

Because of the present labor conditions and costs, it is impractical and uneconomical to process "fantail" shrimp and like arthropoda by hand, that is, to manually remove the front five shell segments and swimmerettes from a deheaded shrimp as well as to remove the midgut or sand vein which extends along a central line on the dorsal side of the shrimp and is embedded a fraction of an inch within the body thereof.

While a variety of processing machines and methods have been proposed and some of which are currently being employed to process "fantail" shrimp, such units are generally characterized by one or more of the following disadvantages, i.e. undue amounts of manual handling of the shrimp; a necessary careful and precise pre-positioning of the shrimp in a carrier structure for entry into the unit; a lack of reliability of operation; an undue sensitivity to workpiece dimension, and continuity and timing problems occasioned by cyclic operation.

The following U.S. patents disclose some of the equipment and techniques that have been suggested and/or employed in the processing of "fantail" shrimp and are indicative of the general state of the art: U.S. Pat. Nos. 2,263,697, 2,663,897, 2,663,900, 2,683,281, 2,702,921, 2,716,776, 2,753,589, 2,784,450, 2,789,309, 2,849,750, 2,850,761, 2,884,657, 2,974,356, 3,122,777, 3,159,871, 3,164,859, 3,214,789, 3,238,561, 3,247,542, 3,277,517, 3,310,832 and 3,566,437.

BRIEF DESCRIPTION OF THE INVENTION

This invention may be briefly described as an improved method and apparatus for the processing of "fantail" shrimp and which includes, in its broad aspects, pneumatically assisted feed means to effect sequential introduction of shrimp into selectively positioned operative impaled relation on a needle bearing transport element, means to longitudinally sever the relatively thin abdominal shell or membrane vertically underlying the first five shell segments and to concurrently disrupt the interconnection between the swimmerettes and the shrimp body and pneumatically induced sequential removal of the first five shell segments by a ventrally to dorsally directed displacement thereof with an ultimate positive rupture of the condyle joints utilizing the dorsal interconnection of the fifth and sixth shell segments as a fulcrum. In its narrower aspects, the subject invention includes a single positively driven transport member having a plurality of peripherally mounted needles thereon disposed within a housing defining an orientation tunnel to selectively preposition shrimp bodies for impalement on said needles in a predetermined and uniform attitude and sequential positively positioned transport of the impaled shrimp through a plurality of operating stations wherein the relatively thin abdominal shell or membrane is longitudinally torn and disrupted. The first five shell sections are pneumatically removed from enveloping relation with the impaled body meat with a concomitant rupture of the condyle joints intermediate the fifth and sixth shell segments; the sand vein exposed and removed and the body portion further cut to provide a "butterfly" configuration as a finished product.

Among the advantages of the present invention is the provision of an improved method of and apparatus for the processing of "fantail" shrimp that minimizes manual handling of the shrimp workpiece and obviates careful prepositioning of the shrimp prior to introduction into the machine. Further advantages include a markedly increased reliability of operation with an attendant reduced sensitivity to workpiece dimension and improved yields of processed product. Still further advantages include a simplicity of contstruction that readily facilitates required disassembly and cleaning of the component elements thereof together with a reduced fabrication costs, operating expense and simplified disposal of the resulting debris, such as shell segments, swimmerettes and the like.

The principal object of the subject invention is the provision of an improved method and apparatus for the processing of "fantail" shrimp and like arthropoda.

Another principal object of this invention is the provision of an improved pneumatically assisted feed and positioning system for the processing of "fantail" shrimp and the like.

Still another principal object of this invention is the provision of an improved pneumatically induced shell displacement system to effect separation and removal of the first five shell segments of a deheaded shrimp from the contained meat and from the undeformed sixth shell segment with concomitant breaking of the condyle joints.

Another object of the present invention is to provide a "fantail" shrimp processing device comprising a motor driven transport member confined within a housing and incorporating a plurality of peripherally extending needles for engaging and impaling deheaded shrimp in uniform predetermined attitude for displacement through a path provided with sequenced operating means to remove the first five shell segments and midgut vein therefrom.

Another object of this invention is to provide a generally arch shaped tunnel within the housing and defining a path of shrimp advance and including a generally funnel shaped entry aperture to initially receive the shrimp.

A further object of this invention is to provide an arch shaped tunnel of predetermined cross sectional configuration that conforms generally with the cross sectional configuration of a shrimp to properly orient a shrimp being pneumatically displaced therewithin.

Another object of this invention is to provide an improved means to remove the mid-gut vein from the shrimp.

Other objects of the invention include the provision of means to longitudinally sever the thin abdominal shell or membrane and to concomitantly disrupt the interconnection between the swimmerettes and the shrimp body and associated means to pneumatically induce the separation of the first five shell segments from the shrimp meat and to discharge the separated shell segments, swimmerettes and mid-gut vein and other debris from the device.

A still further object of this invention is to provide a greatly simplified processing device for producing "fantail" shrimp by the removing and discharge of the first five shell segments, the swimmerettes and the mid-gut vein from the meat portion of the shrimp and from the undeformed sixth shell segment and tail.

Other objects and advantages of the invention will become apparent from the following portions of this specification and from the appended drawings which illustrate, in accord with the mandate of the patent statute, certain apparatus embodiments incorporating the principles of the invention.

BRIEF DESCRIPTION OF THE DRAWINGS

FIG. 13 is a fragmentary elevational view with portions broken away, of an alternative and presently preferred embodiment of a processing device incorporating the principles of this invention;

FIG. 13a is a sectional view taken on the line 13a–13a of FIG.13;

FIG. 13b is a schematic fragmentary elevational view of a suitable endless chain or belt member for shell loosening and debris separation;

FIG. 13c is a schematic fragmentary elevational view of a suitable endless chain or belt member for longitudinal severing of the abdominal membrane or shell;

DETAILED DESCRIPTION OF THE INVENTION

Figure 1:
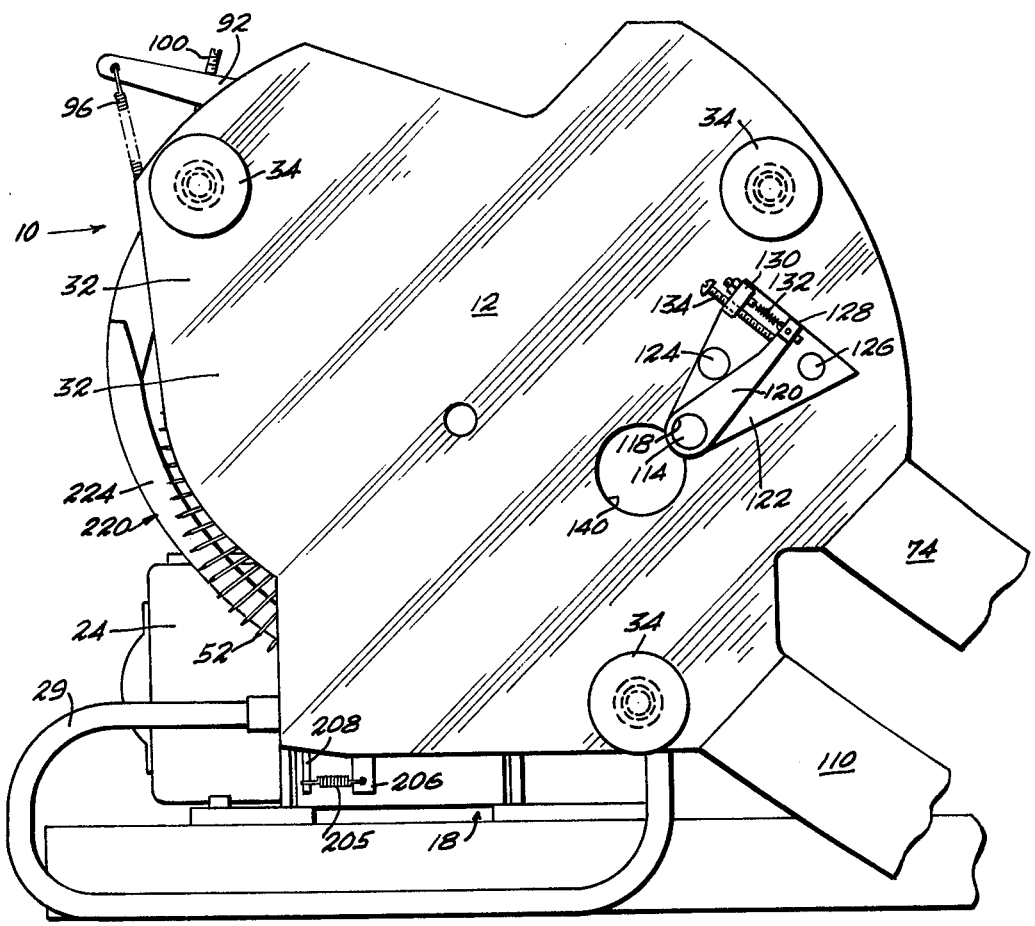
FIG. 1 is an end elevational view of shrimp processing device incorporating the principles of the invention.
Figure 2:
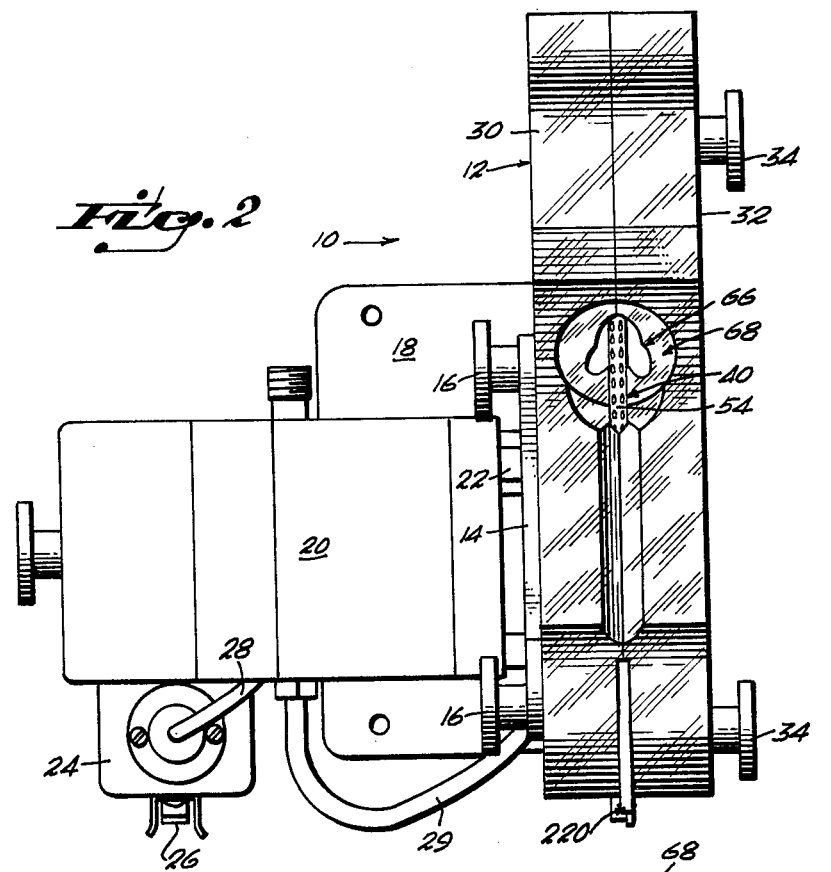
FIG. 2 is a top plan view of the device.
Figure 3:
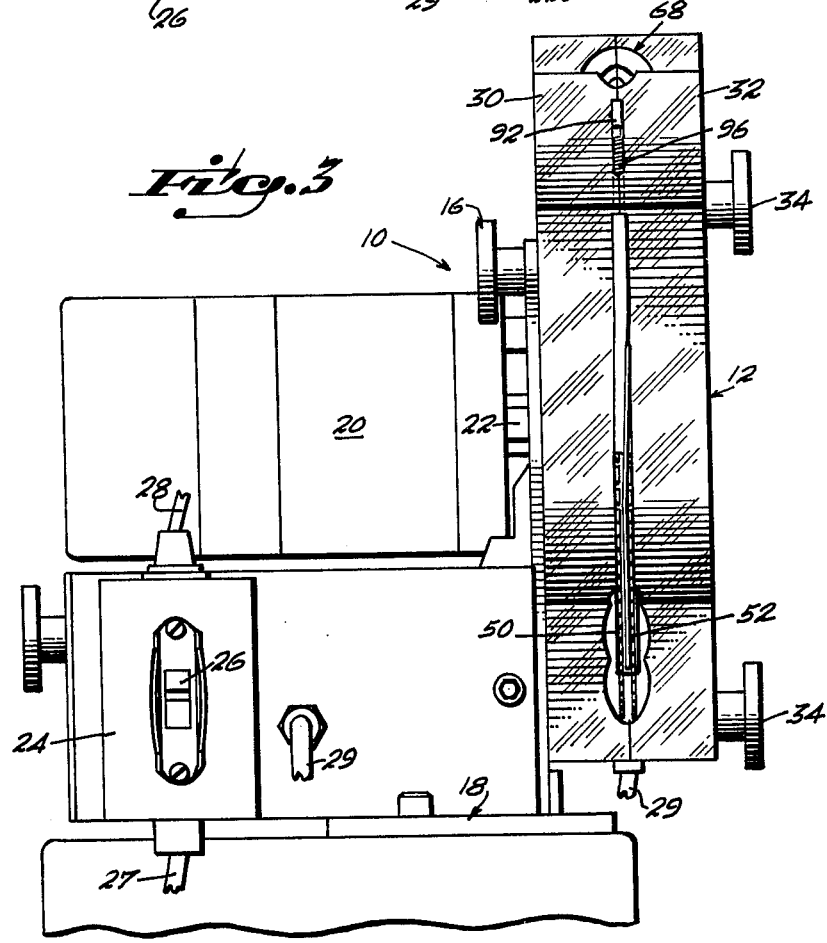
FIG. 3 is a front elevational view of the device.

With reference to the drawings, in which like reference characters designate like or corresponding parts throughout the various views, and with initial particular reference to FIGS. 1, 2 and 3, a shrimp processing apparatus 10 incorporating the principles of the invention, generally comprises a plate like housing 12 mounted on a vertical standard 14 by a plurality of knob screws 16, the standard 14 being fixed, as by welding, to a base plate 18. A power source, such as a motor 20, is fixed to the standard 14, as at 22. A switch box 24 provides a manually operated switch means 26 providing interruptable electric current from an input power cable 27 to the motor 20 through cable 28. A solenoid valve disposed in a water line (not shown) is also connected through the switch means 26 to simultaneously provide a flow of water through a conduit 29 when the motor 20 is activated, for a purpose to be hereinafter described.

Figure 4:
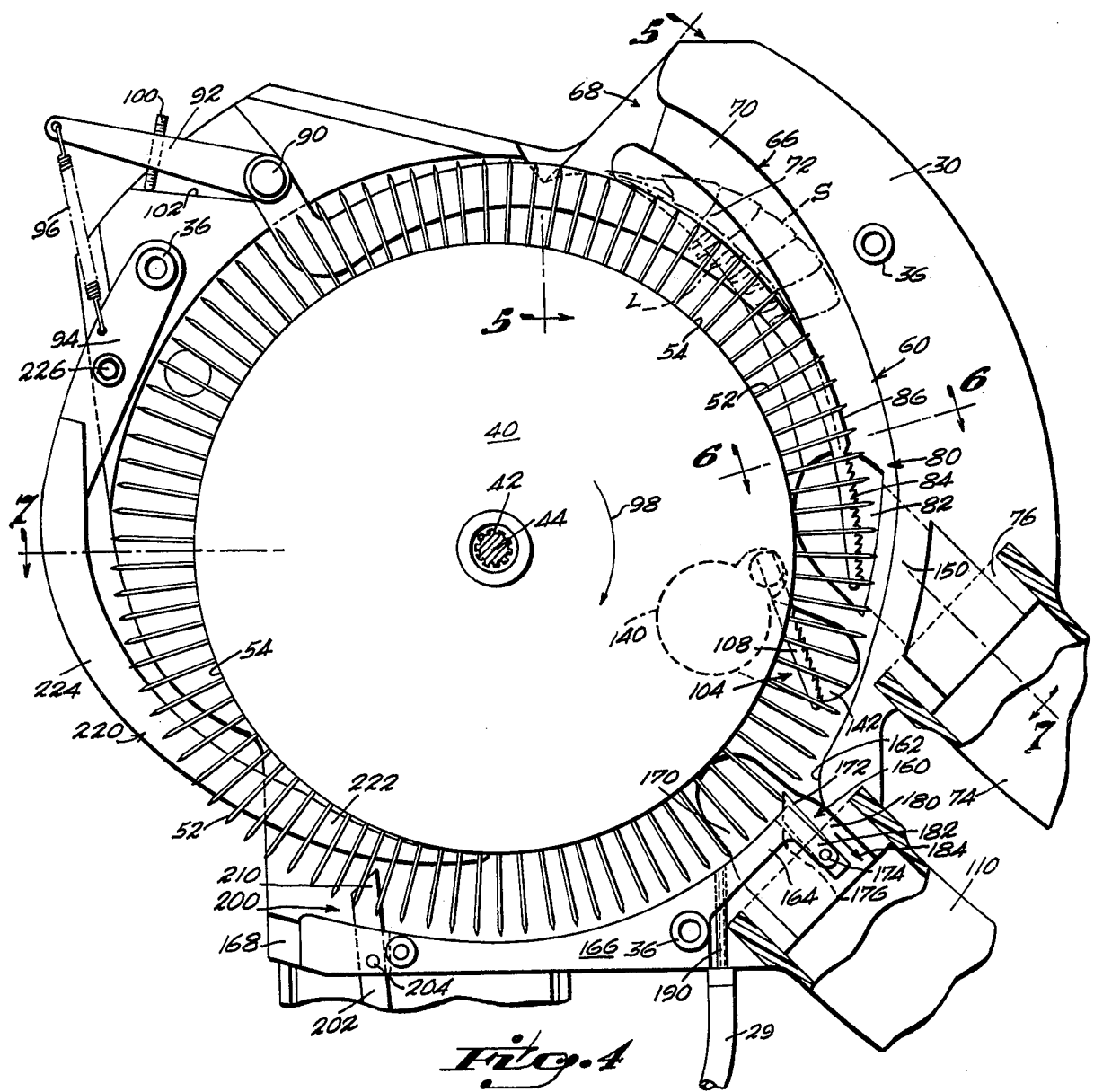
FIG. 4 is an enlarged, fragmentary elevational view, similar to FIG. 1, with the end housing portion removed.

In order to facilitate ready disassembly for cleaning and maintenance, the housing 12 is desirably formed of two half sections 30 and 32, with the outer half section 32 being removably fixed to the inner half section 30 by knob screws 34 which threadedly engage tubular nuts 36 inset in the inner half section 30 (FIG. 4). The inner half section 30 is similarly secured to standard 14 by knob screws 16. Although not operatively essential, the housing portions 30 and 32 are desirably fabricated from a clear, transparent material, such as glass or suitable acrylic resin, to facilitate cleaning and inspection and to permit the operator of the device to visually observe the operations being performed therewithin.

Figure 7:
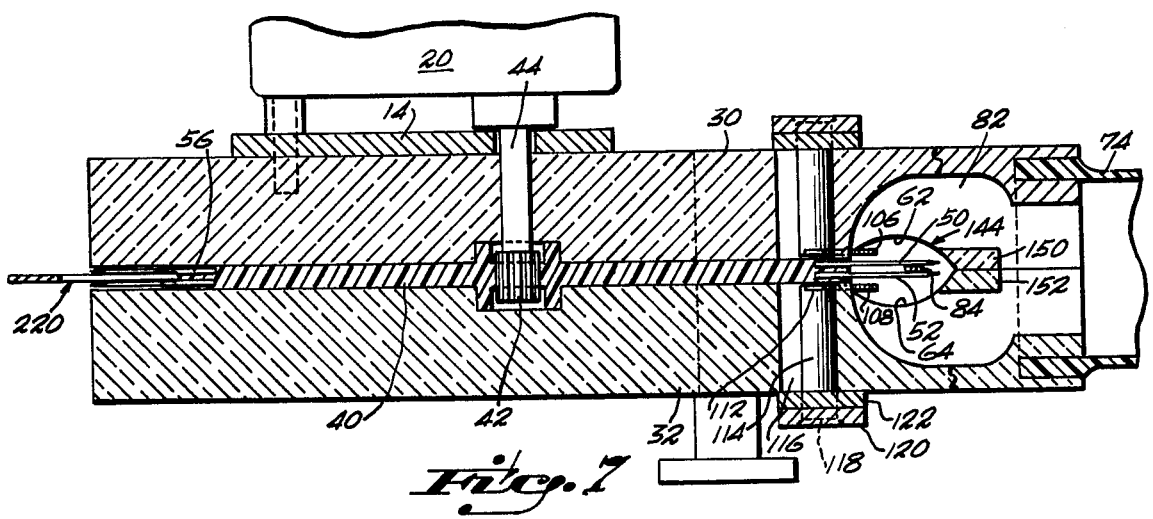
FIG. 7 is a cross sectional view taken along line 7—7 of FIG. 4.

With particular reference to FIGS. 4 and 7, a transport means suitably in the general form of continuously rotatable slotted disc 40 and splined, as at 42, to the end of drive shaft 44 of motor 20, is disposed between the housing half sections 30 and 32. Appropriate confronting cavities are provided in the inner confronting faces on portions of said half sections 30 and 32 to closely accommodate rotatable disc 40. The cavities are sized to provide clearance for two parallel rows of relatively closely spaced, radially extending needles 50 and 52 from the peripheral face 54 of disc 40. Inner end portions 56 of needles 50 and 52 are inset in disc 40 and, as is apparent, the locus of displacement of the needle ends is in the form of a circle.

As best shown in FIGS. 4, 5, 6 and 7, the housing halves 30 and 32 are internally contoured to provide a selectively shaped shrimp entry aperture 68 communicating with a generally arcuate and selectively shaped orientation tunnel, generally designated 60, disposed adjacent to and intersecting the locus of needle displacement to positively direct the introduced shrimp to be processed into proper attitude for repetitive uniformly positioned impalement through the ventral or underside thereof upon the advancing rows of needles 50 and 52 and to thereafter cooperate in maintaining said shrimp in proper attitude and position for the operations to be performed thereon at the various operating stations.

The orientation tunnel 60 is in cross section, desirably in the general shape of an arch 70 of uniform width and with the apex or ceiling thereof progressively approaching, as illustrated intermediate the reference numerals 66 and 60, the locus of displacement of the points of the advancing needles. Such arch-type cross sectional configuration, which is preferably of a blunt pointed character and generally conforms or is complemental to the cross sectional configuration of the dorsal side of a deheaded shrimp, serves to positively locate and position the shrimp in desired attitude during its pneumatically induced advance through the abutting inter-engagement and interfacial contact with the complementally shaped dorsal portions therewith with respect to the path of advance of the needle points. The progressive approach of the ceiling of the arched tunnel 60 to the locus of displacement of the needles serves to both positively maintain the shrimp in proper positional relation or attitude with respect to the approaching needles and to force the ventral or underside thereof down into impaled relation upon the needles as the shrimp is advanced along the tunnel length. Such conjoint action not only serves to straighten out the normally curled shrimp body to a curvature approximating that of the disc 40 periphery but also permits elevation of the tail portion of the shrimp to prevent undesired deformation of the sixth shell segment and tail during the processing operations as hereinafter described. Such pre-positioning of the shrimp into desired attitude during its pneumatically induced initial longitudinal advance through the tunnel 60 results in a highly uniform positioning of the subsequently impaled shrimp, both transversely of the shrimp body and as to depth of impalement, that is essentially independent of the size of the shrimp within a given size range and permits both efficient and high reliability of operations in the downstream operating stations, as will hereinafter be described.

Figure 5:
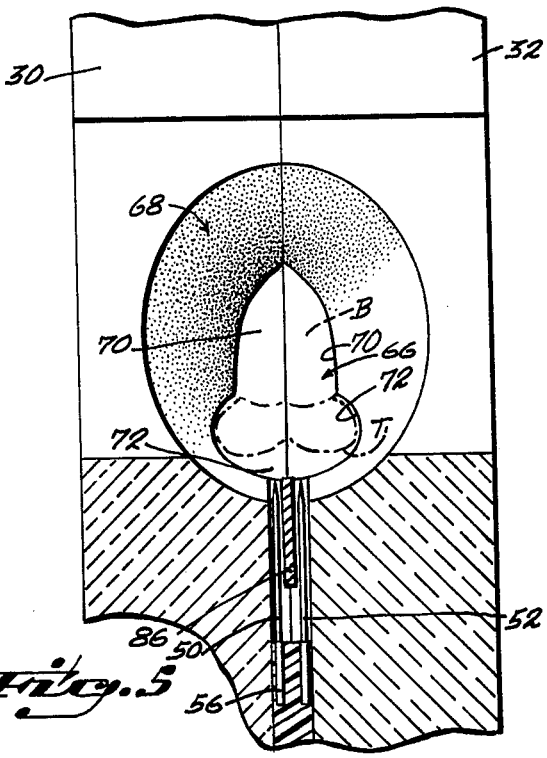
FIG. 5 is a fragmentary cross sectional view taken along line 5—5 of FIG. 4 looking in the direction of the arrows.

As generally illustrated in FIG. 4 and by the stippel shading in FIG. 5, the entry aperture 68 is generally of enlarged elliptical configuration with progressively curved side walls that smoothly and rapidly merge into the defining walls of the orientation tunnel 60. Such contour, in association with the pneumatically induced air flow therethrough effected by the vacuum feed assist, as will be hereinafter described, accommodates neck first, but otherwise generally uncritical, entry of the deheaded shrimp body therein and effects a rapid and automatic introduction of the neck end of the shrimp into the orientation tunnel 60 with the dorsal side of the shrimp being disposed in interfacially abutting contact with the arched tunnel ceiling. Such tunnel configuration and pneumatically induced air flow also serve to maintain the advancing shrimp in proper attitude, essentially independent of its size, in essentially coaxial and symmetric relation with the longitudinal and transverse axes of the tunnel 60, so as to effect uniformly positioned ventral impalement of the shrimp upon the advancing needles 50, 52.

The height and transverse dimensions of the arch shaped orientation tunnel 60 are desirably sized to accommodate shrimp of a predetermined maximum dimension to be processes as, for example, shrimp of 16–20 count per pound. Such above described and sized arched configuration automatically will accommodate shrimp of appreciably lesser size within a predetermined range, as for example, shrimp as small as those of 55–60 count per lb. Initial introduction of such smaller sizes of shrimp with high degree of positioning reliability can, if necessary, or desirable, be facilitated by supplemental utilization of an auxiliary and complementally contoured sleeve type insert or demountable spring member guides for the entry aperture 68 so as to effectively reduce the cross-sectional dimensions thereof and, thus more effectively accommodate the entry of such small size shrimp in proper orientation for entry into the tunnel 60.

Figure 6:
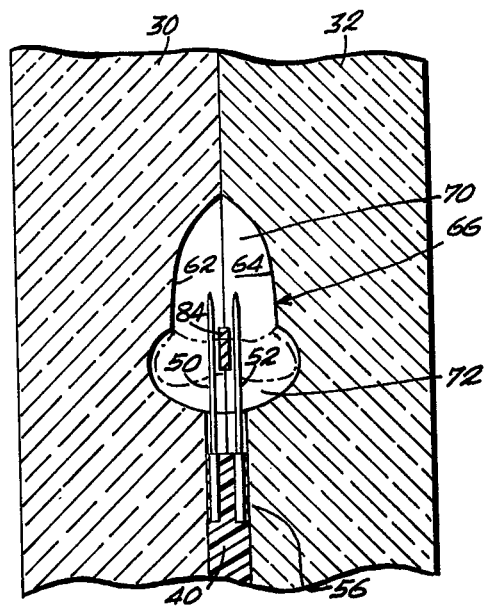
FIG. 6 is a fragmentary cross sectional view taken along line 6—6 of FIG. 4.

As illustrated in FIGS. 4 through 6, the cross-sectional configuration of the orientation tunnel 60 includes a dependent enlarged channel portion 72 to accommodate the normally curled tail portion of a shrimp before the body portion thereof is uncurled by its progressive impalement on the advancing needles and to provide an effectively unblockable air passage or air flow channel to insure an inwardly directed flow of air through entry aperture 68 whenever a previously introduced and advanced shrimp body is disposed within the orientation tunnel 60 and is of a size to effectively fill the same.

The pneumatic feed assist is simply provided by a vacuum conduit 74 connected to a suitable vacuum pump (not shown). The conduit 74 is connected to a fitting 76, formed in the half sections 30 and 32 and communicates with a recess 82 located at the lower end of the above described introductory portion of the orientation tunnel 60. The fitting 76 serves to define a conduit or channel for an induced flow of air that is generally downwardly and outwardly directed from the lower end of the introductory portion of the orientation tunnel 60 and to thus provide strong suction forces on a deheaded shrimp introduced neck first into the entry aperture 68 to draw it inwardly into the confines of the orientation tunnel 60 as seen in FIG. 4. As described above, essentially all shrimp introduced neck end first into the entry aperture 68 will because of the contour of the entry aperture 68, the cross section and contour of the orientation tunnel 60 and the inherent body configurations of a shrimp, be automatically displaced and drawn inwardly to the tunnel 60 in proper attitude as shown in FIG. 4.

As the shrimps approach the first operating station, designated generally at 80, they gradually become more deeply impaled from the ventral side on the two rows of needles 50 and 52 carried by transport disc 40 and once so impaled are thereafter positively held and driven by said needles through the tunnel 60 for the balance of the processing operations. Once the ceiling of the tunnel 60 has reached a predetermined desired spacing with respect to the locus of displacement of the advancing needles 50, 52 that is determinative of the desired degree of impalement the tunnel contour is modified so as to thereafter maintain such ceiling portion thereof in uniform spaced relation with the path of displacement of the needle ends, at least until the contour is terminally modified to facilitate discharge of the processed product from the device.

As will be hereinafter apparent to those skilled in this art, the conjoint impalement of the shrimp on the rows of needles 50, 52 and continued interfacial abutting contact of the dorsal portions of the shrimp with the ceiling of the orientation tunnel 60 and its extension results in a firm positive positioning of each shrimp for engagement with the various operating elements incorporated in the downstream operating stations.

Figure 11:
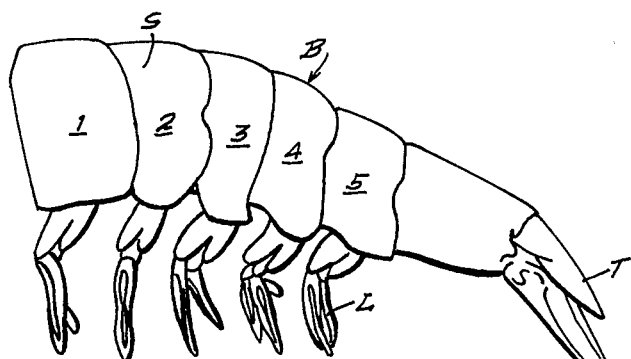
FIG. 11 is a schematic side elevational view of a deheaded, unprocessed shrimp of the type suitable for processing in the device of the present invention.

At the first operating station 80, the shrimps become impaled to their maximum extent and are thus firmly positioned in desired attitude for the processing operations to be performed thereon. Also, it should be noted with respect to FIGS. 4 and 7 that the impaled shrimps are securely retained in driven engagement on needles 50 and 52 as they are moved across the vacuum outlet recess or cavity 82 by confronting bridge portions 150 and 152 of housing portions 30 and 32. As so positively positioned, the ventral side, centrally and between the swimmerettes engages a severing means such as the serrated edge 84 of a generally arcuate lever arm 86. As illustrated in FIG. 4, the lever arm 86 curves upwardly and forwardly and is pivoted at 90 between the housing halves 30 and 32. A second arm 92 of lever 86 is connected at its outer end to an anchor member 94 by a tension spring 96. In this manner the serrated edge 84 is yieldably urged against the shrimp belly or ventral side to longitudinally sever the relatively thin abdominal shell and membrane 97 that underlies shell segments 1 through 5 (FIG. 11) and to rupture the interconnection between the swimmerettes and the shrimp body as the shrimps are advanced clockwise by rotation of the disc 40 as indicated by arrow 98. The serrated edge 84 is adjustably positionable by an adjustment screw 100 threaded through lever arm 92 into engagement with a shoulder 102 formed in housing half 30. Such severing means preferably constitutes means to rip or tear the membrane 97, such as would be effected by the illustrated serrated edge or by hooklike members rather than a razor edge or the like, that would provide a clear cut or slitting type action.

It should be noted that the thin abdominal shell 97 comprises the principal holding means for the swimmerettes and for the lower side portions of the first five shell segments numbered 1 through 5 (FIG. 11) and that when this thin abdominal shell 97 is ruptured along its length, the swimmerettes and such shell segments are substantially loosened relative to the meat of a shrimp. Shell segment six is of different character and the severing means should not effect a change therein.

At the next or second operating station, generally desingated 104, means are provided, such as a pair of spaced apart serrated scraper elements 106, 108 of appreciable transverse extent (FIGS. 4 and 7) to engage the loosened swimmerettes and strip them from the shrimp body and to concomitantly effect a limited loosening displacement of the lower portions of the shell segments 1 through 5 from the contained meat. In the illustrated embodiment, an induced air flow through aperture 140 in each of housing halves 32 and 34, the cavity or recess 142 and through a second vacuum conduit 110 serves to sweep the severed swimmerettes from the tunnel extension and out of the unit.

Each serrated scraper element, such as 108, is fixed at 112 to the inner end of a transverse pivot shaft 114, extending outwardly through an opening 116 in housing section 32 to a point of attachment 118 to the lower end of an exterior lever arm 120. With reference to FIGS. 1 and 7, the pivot shaft 114 extends through a bracket 122, fixed at 124 and 126 to housing section 32, to its point of attachment 118 to lever arm 120. At its upper end 128, lever arm 120 is connected to a bracket lug 130 by a tension spring 132 and a set screw 134, threaded through lug 130, engages the upper lever end 128. In this manner, both of the serrated scraper elements 106 and 108 are positioned for yieldable engagement with the ventral side of the longitudinally severed shrimp to remove the swimmerettes therefrom.

Figure 12:
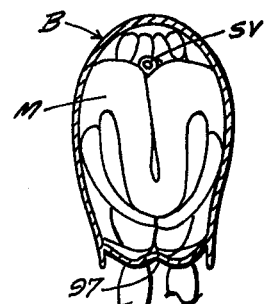
FIG. 12 is a transverse, vertical sectional view through the shrimp of FIG. 11.

The second vacuum conduit 110 from the vacuum pump (not shown) is secured to the housing in a manner similar to previously described vacuum conduit 74 and is positioned closely adjacent to a third operating station, generally designated 160. The third operating station 160 broadly provides for the removal of the first five shell segments 1 through 5 from the shrimp and removal of the mid-gut vein SV, illustrated in FIG. 12, as well as for the discharge of said mid-gut vein, five shell segments, previously dislodged swimmerettes and other debris by the induced air flow through conduit 110. The primary air intake to second vacuum conduit 110 comprises the above described wall openings 140 via cavity 142 and the extension of the orientation tunnel 60 downstream thereof into the relatively larger mouth of the discharge conduit fitting. As best shown in FIG. 4, the ceiling portion of the extension of the orientation tunnel 60 downstream of cavity 142 merges, through a smoothly curved surface 162 with the upstream side wall of the second vacuum and discharge conduit 110.

A substantial portion of an enlarged recess 170 disposed adjacent the mouth of vacuum conduit 110 is spanned by a partial bridge segment 164 of a bracket member 166, fixed in appropriate recesses such as 168, FIG. 4, of the two housing sections 30 and 32. A knife blade 172, pivoted at 174 in a slot 176 is mounted in the leading end of partial bridge segment 164 in such manner as to be disposed in the conduit opening and in longitudinal alignment with the apex of the center of the extension of the orientation tunnel 60. The tip or cutting end of knife blade 172 projects into the extension of the tunnel 60 a distance sufficient to longitudinally split the back or dorsal side of the shrimp to a depth sufficient to permit removal of the sane vein SV by flow of air induced by the vacuum forces of conduit 110 in combination with the flushing action of a water jet to be hereinafter described.

The previously described induced flow of air inwardly through cavity 142, the extension of the tunnel 60 and to the second vacuum conduit 110 serves to sequentially lift the shell segments 1 through 5 in the dorsal direction and to physically separate such shell segments from the impaled meat as the overlying restraint exercised by the interfacial contact of the ceiling of the tunnel extension with such shell segments is removed by the progressive advance of the impaled shrimp into alignment with the curved surface 162 merging into vacuum conduit 110. Such shell segments are thus progressively lifted and turned into the mouth of the conduit 110 and discharged through the channel 180 by the induced air flow or suction forces extant in the area immediately upstream of the knife blade 172. The discharge path taken by the progressively lifted and displaced shell segments is indicated by the arrow 184, said path being generally at right angles to the shrimp meant impaled on the needles 50, 52.

As will now be apparent, the induced air flow causes each shell segment to be effectively lifted and bent at substantially right angles to the next succeeding shell segment and in a positive separation and removal of each of the shell portions from the previously encased meat. Of particular importance is the relative ease of rupture of the condyle joints disposed intermediate the fifth and sixth shell segments; the latter being positioned rearwardly of the swimmerettes and tightly surrounding the rear portion of the shrimp body in unruptured and integral condition. Such right angle displacement of the fifth shell segment attendant its being swept into the conduit 110 is effected about a fulcrum located at the apex of the dorsal spine relative to the sixth shell segment and results in a simple, clean and effective rupture of the condyle joints and concomitant complete separation of shell segments 1 through 5 from the impaled meats and from the tail and sixth shell segment still integral therewith. Shell segments 1 through 5 are thus swept out by the induced air flow through conduit 110 while the remaining portions of the "fantailed" shrimp meat advance into engagement with the knife 172.

Although the above described pneumatic separation and removal of shell segments 1 through 5 is normally effected in the manner described above, added insurance of reliability is provided by the interposition of the sand vein exposure knife blade 172 and adjacent slot defining wall members of the partial bridge member 164. If, for some reason, the induced air flow does not lift a shell segment and sweep it into the conduit 110, the continued advance of the impaled shrimp into engagement with the mid-gut vein knife 172 through continued advance of the transport disc 40, causes the leading edge of any such shell segment to engage the knife assembly. Such engagement in conjunction with concomitant continued advance of the impaled shrimp meat will result in a dorsally directed or lifting type of camming action and accompanying mechanical assist to insure, still within the locus of induced air flow outwardly through conduit 110, shell separation.

The liquid conduit 29, as previously described, is connected to a relatively small diameter tube 190, positioned to generally direct a jet like stream of water on the opened area of the sand vein SV (FIG. 12) to flush the same and thereby assist the induced air flow in accomplishing complete removal of the sand vein from the shrimp, and its discharge through the vacuum conduit 110.

Figure 8:
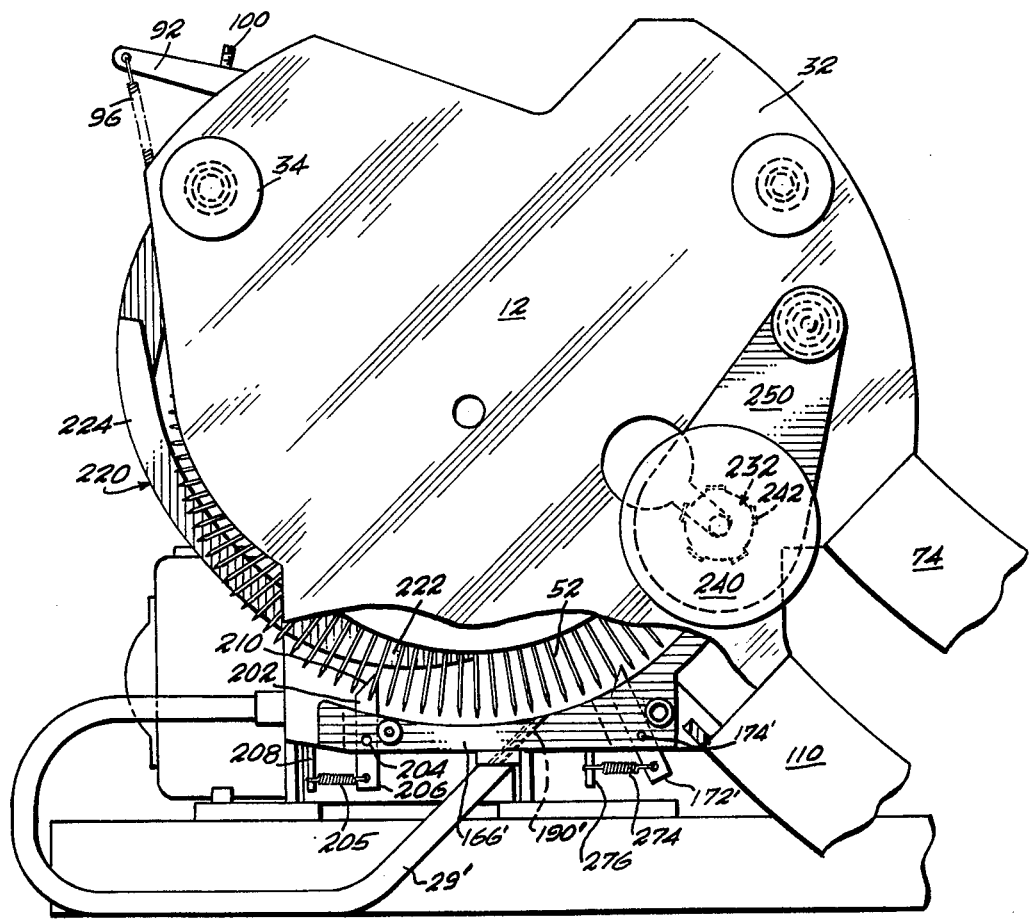
FIG. 8 is a view similar to FIG. 1 with parts broken away to illustrate a modified form of the invention.

From the third operating station 160, the impaled and now peeled shrimp is advanced to a fourth operating station 200 to be split or "butterflied". This further splitting operation is effected by a knife blade 202 that is pivotally mounted 204 to a bracket 166 and disposed between the two rows of needles 50 and 52 on disc 40. As illustrated in FIG. 8, the knife blade 202 is spring loaded by a tension spring 205 fixed between the outer knife end 206 thereof and a pin 208 fixed to the housing. The inner end 210 of knife 202 extends between the two rows of needles 50 and 52 to a predetermined depth. The depth of cut required to "butterfly" each shrimp is determined by the elevation of a stripper blade 220 which engages the ventral side of the impaled shrimp and cams it radially outwardly of the needles as the shrimp advances therepast. Of course, if the fantailed shrimp being processed are not to be "butterflied", the knife blade 202 may be removed.

The process shrimp are removed from the two rows of needles 50 and 52 and discharged from the device by the continued advance thereof with the disc 40 relative to said arcuate stripper blade 220. The stripper blade 220 extends between the rows of needles 50 and 52 and its increasing radial extent intermediate its lower end 222 and upper end 224 serve to displace the impaled shrimp outwardly of the needles, after departure from the extension of the tunnel and to thereby strip or remove the shrimp from the transport disc 40. Attachment means 36 and 226 fix the stripper blade 220 to the housing 30.

FIG. 8 illustrates an alternative mounting structure for positioning the knife blade 172 for exposure and removal of the mid-gut vein SV. In this modified structure, the blade 172 is pivoted at 174 slightly downstream of the mouth of vacuum conduit 110 and the liquid jet tube 190 is disposed further downstream and angularly positioned to direct a jet of liquid along the area of the mid-gut vein toward the mouth of vacuum conduit 110 as the slit shrimp is advanced therepast.

Figure 9:
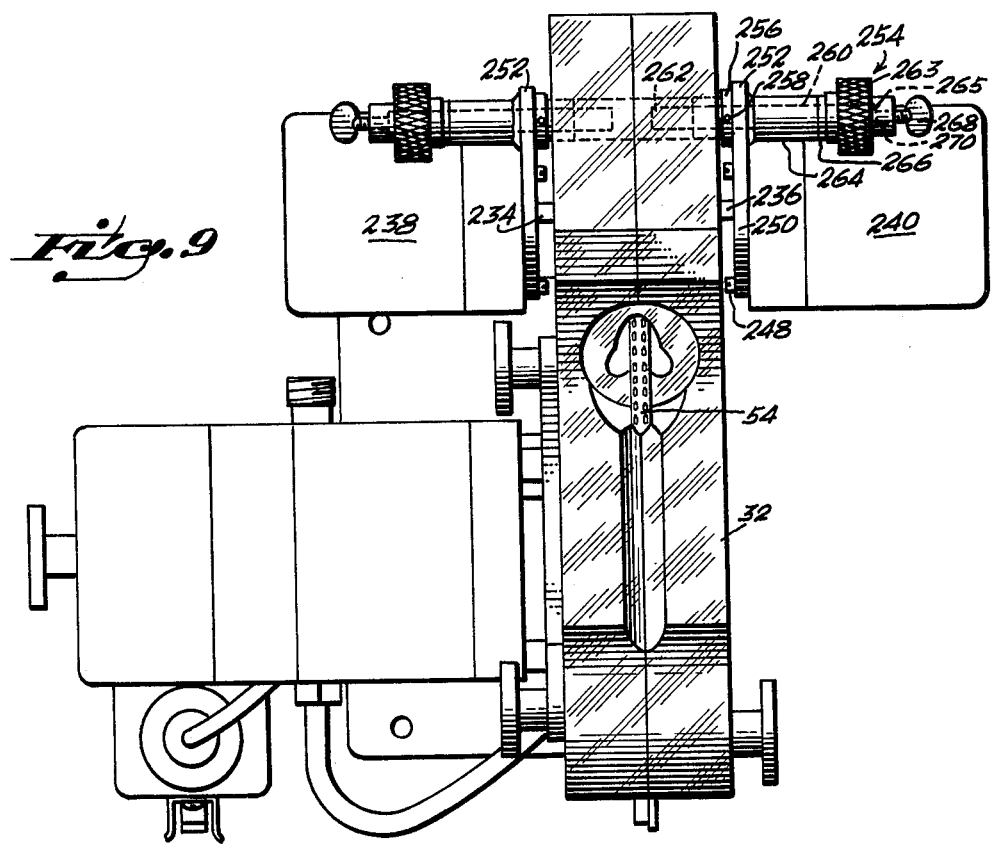
FIG. 9 is a top plan view of the device illustrated in FIG. 8.
Figure 10:
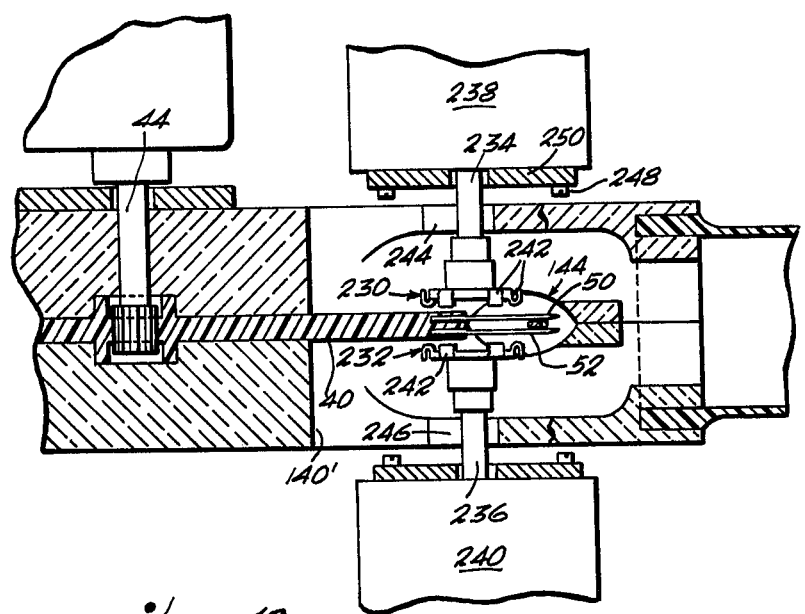
FIG. 10 is a fragmentary sectional view, similar to FIG. 7, illustrating the device of FIGS. 8 and 9.

FIGS. 8, 9 and 10 illustrate a further alternative construction for a swimmerette removing assembly. In place of the serrated scraper members 106 and 108, as shown in FIGS. 4 and 7, and described above, a pair of rotary stripper or scraper elements 230 and 232 are mounted on the inner ends of drive shafts 234 and 236 of respective drive motors 238 and 240. The rotary stripper or scraper elements are thus externally positioned on opposite sides of needles 50 and 52. Each rotary stripper element 230 and 232 carries a plurality of peripheral stripper or scraper 242. Drive shafts 234 and 236 extend through slots 244 and 246 in communication with wall openings 140.

Each such motor 238 and 240 is fixed, as by screws 248, to a pendulum type of pivot bracket 250, carried at its upper end 252 by an adjustable pivot assembly 254. As seen in FIG. 8, the pivot bracket 250 is angled downwardly and inwardly in a manner so as to permit the forces of gravity to maintain the rotary stripper elements 230 and 232 in engagement with the locus of swimmerette attachment along each side of the shrimp as they are advanced thereabout on needles 50 and 52 by continued rotation of the disc 40.

Pivot assembly 254 is adjustable to laterally position the rotary swimmerette strippers 232 relative to the positioning of the two rows of shrimp swimmerettes. To this end, a collar member 256, by means of a set screw 258, is inwardly and outwardly adjustable along a stud 260 having an inner end 262 fixed in housing portion 32. Bracket 250 pivotally lies against collar 256 and is movable therewith. A sleeve 264, fixed to bracket 250, is journaled along stud 260 and a knurled knob 263, is threaded onto the outer screw threaded portion 256 of stud 260. A bearing washer 266 of a suitable synthetic material is interposed between the knob 263 and the end of sleeve 264. A set screw 268 is axially threaded through knob 263 into engagement with the end 270 of stud 260.

In the operation of the described unit the advancing shrimp impaled on the rows of needles 50 and 52 will inwardly pivot the rotary cutters 230 and 232 and their associated motors and pivot brackets a distance depending upon the sizes of shrimp pressing thereagainst. The rotating cutters 230 and 232 completely remove the swimmerettes for discharge through vacuum conduit 110.

FIG. 13 schematically illustrates various features of a simplified and presently preferred structure incorporating the principles of this invention and employing a single vacuum conduit to induce the air flow to both assist the entry of the shrimp into the orientation tunnel and to accomplish the above described pneumatically induced shell removal. In this embodiment, the orientation tunnel 460 is of a gentle "S" curved longitudinal configuration with an enlarged entry aperture 468 of the character heretofore described to accommodate neck first, but otherwise generally uncritical entry of deheaded shrimp therein. The orientation tunnel 460 fluidly communicates with a vacuum conduit 476 which serves to provide a selectively directed flow of air inwardly through entry aperture 468 for feed assist purposes as described above. The pneumatically assisted feed of shrimp introduced into the entry aperture 468 into the desired attitude within the orientation tunnel 460, wherein the dorsal portions of the advancing shrimp are disposed in interfacial contact with the complementally shaped ceiling portion of the tunnel preparatory to and continuing through ventral impalement thereof, is essentially the same as that heretofore described. In this embodiment the introduced shrimp are thus again advanced in proper attitude for uniformly positioned ventral impalement upon the rows of spaced needles 450 and 452 mounted on the periphery of a rotatable disc 440 which is deeply slotted as shown at 442. As will become hereinafter apparent, the first and second operating stations are here effectively combined and comprise a plurality of postively driven endless belt or chain assemblies mounted on suitable guide frames that are pivotally mounted on a common pivot pin 400 and are biased in a counterclockwise direction by individual bracing springs, such as the springs 402 and 404.

In more particularity, the abdominal membrane or shell severing means comprising the first operating station is here formed of a plurality of hook members 410 on an independently driven chain or belt 412 guided by a pivotally mounted guide frame 414 disposed within the slot 442 and intermediate the needle members 450 and 452. In operation of the described unit, the chain or belt 412 is advanced at a greater velocity than that of the impaled shrimp on the rotating disc 440 so as to effect a relative clockwise and subtstantially constant spaced advance of the hooks 410 relative to the shrimp body and from the tail to neck direction to longitudinally tear or rip the abdominal membrane and disrupt the interconnection between the swimmerettes and the impaled shrimp body as heretofore described.

In a similar manner, the swimmerette removing and shell loosening means heretofore constituting the second operating station here comprise a pair of positively driven chain or belt members 430, having scraper or stripper bars 432 incorporated thereon. The chain belt members 430 are each supported by pivotally mounted guide frames 436, 438 and are disposed externally adjacent the rows of needle members 450 and 452. Here again, the chain feed drive is set to advance the chains 430 at a greater velocity than that of the impaled shrimp on the continuously rotating disc 440, so as to thus effect a clockwise and substantially constant spaced advance of the scraper and stripper bars 432 relative to the shrimp body and from the tail to the neck direction to remove the swimmerettes and to preliminarily loosen the shell segments throughout from the contained body meat.

As illustrated, the path of travel of the chain or belt members is determined by the shape of the guides 414, 436 and 438. The specific contour considerations are essentially the same as those described earlier and when once impaled to the proper depth, the interfacial contact of the dorsal portions of the impaled shrimp with the tunnel ceiling when coupled with the spring biased pivotal mounting of the chain driven operating elements and uniformly spaced relation thereof with the tunnel ceiling in the operating zones assures uniformity and reliability of the described operations.

The remaining components and operations such as shell removal, said vein exposure and removal and butterflying are essentially similar to those described above and thus the single vacuum conduit 476 in addition to providing the necessary air flow for shrimp feed assist purposes also effects the separation of the shell segments and the pneumatic discharge of the shell segments, swimmerettes, sand veins and other debris.

Figure 14:
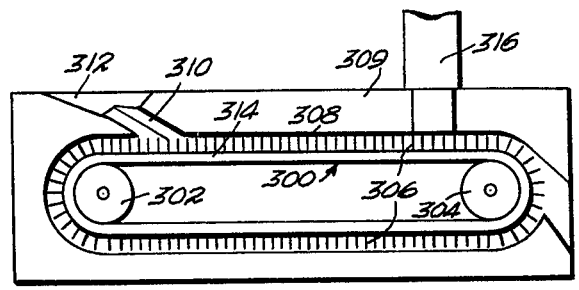
FIG. 14 schematically illustrates another form of a transport mechanism utilizable in the device.
Figure 15:
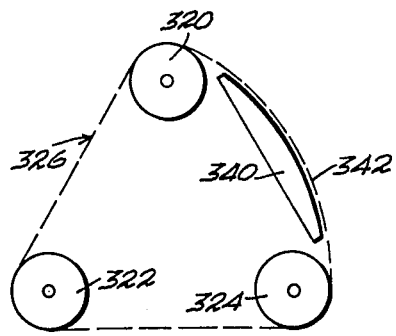
FIGS. 15 and 16 schematically illustrate still further forms for such shrimp transport mechanisms.
Figure 16:
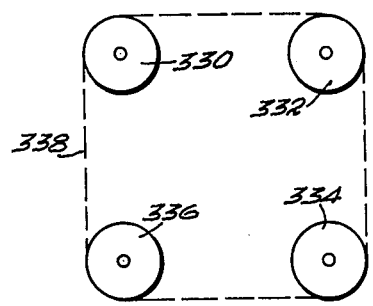

FIGS. 14, 15 and 16 schematically illustrate some of the modified shrimp transport forms which may be utilized in place of the disc 40. FIG. 14 illustrates a transport means in the form of an endless chain or belt means 300 engaged about a driven sprocket or pulley 302 and an idler 304. A plurality of needles 306 extend outwardly from the chain or belt means 300 into a tunnel 308 in housing 309. An infeed tunnel portion 310 from an infeed mouth 312 provided adjacent a first end of a top run 314 of the transport means 300, and a vacuum conduit 316 opens into tunnel 308 adjacent a second end thereof. The various functional elements hereinabove described relative to the preferred form of the device are positioned along the top run 314 to function with the vacuum forces in conduit 316 to accomplish the removal and discharge of the shell, swimmerettes and mid-gut vein of the shrimp.

FIGS. 15 and 16 simply illustrate other forms of transport means utilizing three sprockets or pulley 320, 322 and 324 engaged by a chain or belt 326, and four sprockets or pulleys 330, 332, 334 and 336 engaged by a chain or belt 338.

In all three of the forms of FIGS. 14, 15 and 16, it is preferable to provide a curved track 340 as seen in FIG. 15 to impart a like curvature to the functional run of chain or belt such as at 324 to generally conform with the inherent curvature of the shrimp as described relative to disc 40. It is understood that the various operational elements as hereinbefore described for removal of the shrimp shell, swimmerettes and mid-gut vein will be positioned along the functional runs of the transport means of the invention forms of FIGS. 14, 15 and 16.

Having thus described our invention, we claim:

1. A device for processing shrimp and like arthropoda comprising a housing, a tunnel opening through said housing including a main portion and outwardly opening infeed and discharge end portions, interconnected by said main portion;

means to ventrally impale shrimp fed into said infeed portion of said tunnel and to transport them through said main tunnel portion and discharge end portion;

means to orient shrimp fed into said infeed portion of said tunnel in predetermined attitude during advance of said shrimp therethrough precedent to ventral impalement on said transport means;

operating means positioned relative to the path of advance of ventrally impaled shrimp through said main tunnel portion to longitudinally sever the abdominal membrane of each ventrally impaled shrimp to loosen the front shell sections thereof, to strip the swimmerettes therefrom and to longitudinally slit the dorsal side of the shrimp meat to expose the mid-gut vein as said ventrally impaled shrimp are advanced by said transport means through said main tunnel portion;

air flow inducing vacuum means opening into said main tunnel portion to pneumatically advance the shrimp fed into said infeed portion therethrough into ventrally impaled engagement with said transport means and to pneumatically displace the swimmerettes, front shell sections and mid-gut vein from each impaled shrimp meat being transported through said main tunnel portion and to discharge such debris from the device.

2. The device as set forth in claim 1 wherein said transport means comprises a motor driven disc having at least two closely spaced apart rows of radially extending needles peripherally mounted thereon.

3. The device as set forth in claim 1 wherein said operating means to longitudinally sever the abdominal membrane of each ventrally impaled shrimp conprises a yieldably mounted cutting element engageable with the ventral underside of said shrimp as the latter is advanced therepast with the dorsal side thereof disposed in interfacial contact with said main tunnel portion.

4. The device as set forth in claim 3 wherein said operating means comprises a plurality of moving hook members adapted to be displaced from the tail to the forward end of said ventrally impaled shrimp.

5. The device as set forth in claim 1 wherein said operating means to strip the swimmerettes from the underside of each ventrally impaled shrimp comprises a yieldably mounted scraper element engageable with the ventral underside of said shrimp as the latter is advanced therepast with the dorsal side thereof disposed in interfacial contact with said main tunnel portion.

6. The device as set forth in claim 5 wherein said operating means comprises a plurality of moving scraper members adapted to be displaced from the tail to the forward end of said ventrally impaled shrimp.

7. The device as defined in claim 1 wherein said air flow inducing vacuum comprises a vacuum means conduit.

8. The device as defined in claim 1 wherein said air flow inducing means comprises a first vacuum conduit for advancing shrimp through said tunnel precedent to ventral impalement thereof and a second vacuum conduit for separating and discharging said shells and other debris.

9. The device as set forth in claim 1 wherein said operating means to expose the mid-gut vein comprises a cutting element extending a predetermined distance into said main tunnel portion disposed adjacent said vacuum means opening into said tunnel.

10. The device as defined in claim 1 including means for directing a stream of liquid onto the exposed mid-gut vein.

11. The device as set forth in claim 1 including means engageable with the underside of said impaled shrimp being advanced by said transport means to displace the same from impaled relation thereon and cutting means engageable with the dorsal side of shrimp during displacement thereof by said last mentioned means to butterfly said shrimp prior to their separation from said transport means.

12. Apparatus for processing deheaded shrimp and like arthropoda to produce a fantailed product comprising,
 housing means shaped to provide a tunnel for shrimp passage therethrough;
 means for advancing ventrally impaled shrimp through said tunnel with the dorsal portions of the shell segments of said shrimp disposed in interfacial contact with the defining walls thereof;
 means for longitudinally severing the abdominal membrane of said ventrally impaled shrimp and loosening the shell segments of said shrimp from the ventrally impaled meat disposed therewithin; and
 means for separating said loosened shell segments from encircling relation with said impaled meat by pneumatically induced and selectively directed ventral to dorsal displacement of said shell segments as the tunnel wall contacting dorsal portions thereof progressively advance into alignment with a debris discharge aperture in said tunnel.

13. Apparatus as set forth in claim 12 including
 means disposed in alignment with the path of advance of said ventrally impaled shrimp and in close proximity with said debris discharge aperture in said tunnel for cutting the dorsal portion of said impaled and peeled shrimp to expose the sand vein therewithin and to mechanically deflect any unseparated shell segments disposed in encircling relation with said shrimp meat into said debris discharge aperture.

14. Apparatus as set forth in claim 13 including means disposed adjacent to said cutting means for directing a jet of fluid into said cut dorsal portion of said impaled and peeled shrimp to flush the sand vein therefrom for pneumatically induced removal through said debris aperture.

15. Apparatus as set forth in claim 13 including means associated with said cutting means for at least partially bridging said debris discharge aperture and engageable by said ventrally impaled and peeled shrimp meat to limit displacement thereof relative to said debris discharge aperture.

16. Apparatus as set forth in claim 12 wherein said ventrally impaled shrimp advancing means includes a transport member having at least two closely spaced rows of needle members peripherally mounted thereon.

17. Apparatus as set forth in claim 12 wherein said means for longitudinally severing the abdominal membrane concomitantly disrupts the interconnection between the swimmerettes and the shrimp body.

18. Apparatus as set forth in claim 12 wherein said shrimp advancing means further comprises a rotatable disc having at least two closely spaced rows of needle members radially extending from the periphery thereof and said means for longitudinally severing of the abdominal membrane is disposed intermediate said rows of needles.

19. Apparatus as set forth in claim 18 wherein said means for loosening said shell is disposed externally adjacent to said rows of needles.

20. Apparatus as set forth in claim 12 wherein said means for severing the abdominal membrane and loosening the shell segments comprises endless belt mounted members.

21. Apparatus as set forth in claim 12 wherein said means for separating said loosened shell segments includes a suction induced air flow to permit ready debris disposal.

22. Apparatus for processing deheaded shrimp and like arthropoda to produce a fantailed product comprising
 housing means shaped to provide a tunnel therethrough having a ceiling portion of a contour complemental to that of the dorsal side of a shrimp;
 means defining an enlarged entry aperture curvedly merging with the defining walls of said tunnel to receive neck first entry of a deheaded shrimp therein;
 displaceable transport means disposed within said housing peripherally mounting a plurality of needle members having a path of displacement that intersects said tunnel and progressively approaches the ceiling portion thereof; and
 means for inducing a flow of air through said entry aperture and into said tunnel to selectively displace said shrimp introduced into said entry aperture neck first into said tunnel with the dorsal portion of said shrimp disposed in interfacial contact with the ceiling portion of said tunnel and to advance said shrimp into uniformly positioned ventrally impalable relation with said needle members as the path of displacement of the latter intersects said tunnel and progressively approaches the ceiling portion thereof.

23. Apparatus as set forth in claim 22 wherein said tunnel is of substantially uniform cross section.

24. Apparatus as set forth in claim 22 wherein said ceiling portion of said tunnel is of arch like configuration.

25. Apparatus as set forth in claim 22 wherein said transport means is a rotatable disc having at least two rows of peripherally mounted needles radially extending therefrom and said tunnel is of arcuate configuration.

26. Apparatus as set forth in claim 22 including auxiliary conduit means to insure a flow of air inwardly through said entry aperture when said tunnel is substantially closed by a shrimp being advanced therethrough.

27. Apparatus for processing deheaded shrimp and like arthropoda to produce a fantailed product comprising

- housing means shaped to provide a tunnel therethrough having a ceiling portion of a contour complemental to that of the dorsal side of a shrimp and including a debris discharge aperture therein;
- means defining an enlarged entry aperture curvedly merging with the defining walls of said tunnel to receive neck first entry of deheaded shrimp therein;
- displaceable transport means disposed within said housing peripherally mounting a plurality of needle members having a path of displacement that intersects said tunnel and progressively approaches the ceiling portion thereof;
- means for inducing a flow of air through said entry aperture and into said tunnel to selectively displace said shrimp introduced into said entry aperture neck first into said tunnel in predetermined attitude with the dorsal portion of said shrimp disposed in interfacial contact with the ceiling portion of said tunnel and to advance said shrimp into uniformly positioned ventrally impalable relation with said needle members as the path of displacement of the latter intersects said tunnel and progressively approaches the ceiling portion thereof;
- means for displacing said displaceable transport means relative to said tunnel to advance ventrally impaled shrimp through said tunnel with the dorsal portions of the shell segments of said shrimp disposed in interfacial contact with the defining walls thereof;
- means for longitudinally severing the abdominal membrane of said ventrally impaled shrimp and loosening the shell segments of said shrimp from the ventrally impaled meat disposed therewithin; and
- means for separating said loosened shell segments from encircling relation with said impaled meat by a selectively directed and pneumatically induced ventral to dorsal displacement of said shell segments as the tunnel wall contacting dorsal portions thereof progressively advance into alignment with said debris discharge aperture in said tunnel.

28. Apparatus as set forth in claim 27 including
- means disposed in alignment with the path of advance of said ventrally impaled shrimp and in close proximity with said debris discharge aperture in said tunnel for cutting the dorsal portion of said impaled shrimp to expose the sand vein therewithin and to mechanically deflect any unseparated and loosened shell segments disposed in encircling relation with said shrimp meat into said debris discharge aperture.

29. Apparatus as set forth in claim 27 wherein said displaceable transport means comprises a disc having at least two closely spaced apart rows of radially extending needles peripherally mounted thereon.

30. Apparatus as set forth in claim 27 wherein said means for longitudinally severing the abdominal membrane comprises a yieldably mounted chain member having a plurality of hook members extending therefrom adapted to be displaced from the tail to the neck of said ventrally impaled shrimp.

31. Apparatus as set forth in claim 27 wherein said means for loosening the shell segments from the ventrally impaled meat comprises yieldably mounted chain members each having a plurality of scraper bars mounted thereon engageable with the underside of said shell segments and adapted to be displaced from the tail to the neck of said ventrally impaled shrimp.

32. Apparatus as set forth in claim 27 wherein said means for inducing a flow of air through said entry aperture and for pneumatically inducing said shell separation comprises suction means connected to said debris discharge aperture.

* * * * *

UNITED STATES PATENT OFFICE
CERTIFICATE OF CORRECTION

Patent No. 4,087,887　　　　　　　　Dated May 9, 1978

Inventor(s) Paul H. Hoffman, et al.

It is certified that error appears in the above-identified patent and that said Letters Patent are hereby corrected as shown below:

Col. 5, line 4　change "pre-positioning" to -- prepositioning--

Col. 8, line 9　change "sane" to -- sand --;

line 31 change "meant" to -- meat --;

Col. 10, line 15 change "256" to -- 265 --.

Signed and Sealed this

Twenty-first Day of November 1978

[SEAL]

Attest:

RUTH C. MASON
Attesting Officer

DONALD W. BANNER
Commissioner of Patents and Trademarks